(12) United States Patent
Nissen et al.

(10) Patent No.: US 11,183,077 B2
(45) Date of Patent: Nov. 23, 2021

(54) VR EMULATOR ABOARD AIRCRAFT

(71) Applicant: Bell Helicopter Textron Inc., Fort Worth, TX (US)

(72) Inventors: Jeffrey Paul Nissen, Alba, TX (US); Daniel Brent McCall, Keller, TX (US); Joshua Peter Riccobono, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 315 days.

(21) Appl. No.: 15/936,894

(22) Filed: Mar. 27, 2018

(65) Prior Publication Data
US 2019/0130782 A1    May 2, 2019

Related U.S. Application Data

(60) Provisional application No. 62/581,012, filed on Nov. 2, 2017.

(51) Int. Cl.
| | |
|---|---|
| *G09B 9/30* | (2006.01) |
| *G09B 9/08* | (2006.01) |
| *G02B 27/01* | (2006.01) |
| *G06T 19/00* | (2011.01) |
| *G09B 9/12* | (2006.01) |
| *G09B 9/24* | (2006.01) |

(52) U.S. Cl.
CPC ......... *G09B 9/307* (2013.01); *G02B 27/0172* (2013.01); *G06T 19/006* (2013.01); *G09B 9/085* (2013.01); *G09B 9/12* (2013.01); *G09B 9/24* (2013.01); *G02B 27/017* (2013.01)

(58) Field of Classification Search
CPC ...................................................... G09B 9/307

USPC ........................................................... 434/38
See application file for complete search history.

(56) References Cited

U.S. PATENT DOCUMENTS

| | | |
|---|---|---|
| 5,762,612 A | 6/1998 | Campbell |
| 5,865,624 A | 2/1999 | Hayashigawa |
| 7,099,752 B1 | 8/2006 | Lenell et al. |

(Continued)

FOREIGN PATENT DOCUMENTS

WO    2015059671 A1    4/2015

OTHER PUBLICATIONS

European Search Report in related European Application No. 18203764.8 dated Feb. 25, 2019, 5 pages.

(Continued)

*Primary Examiner* — Kesha Frisby
(74) *Attorney, Agent, or Firm* — Lightfoot & Alford PLLC (57) ABSTRACT

Systems and methods include providing a virtual reality ("VR") flight teleport system that includes a master aircraft and a plurality of remote slave aircraft connected through a network. A flight emulator in the master aircraft allows a user in the master aircraft to "teleport" into a remote slave vehicle in order to observe and/or assume control of the remote slave aircraft. Motion of, orientation of, and/or forces acting on the remote stave vehicle are emulated to the user of the master vehicle through a pilot control interface, a motion-control seat, and a head-mounted display to provide real-time feedback to the user of the master aircraft. Inputs made via the pilot control interface of the flight emulator system in the master aircraft are transferred through the network into the flight control system of the remote slave vehicle to control operation of the remote slave vehicle.

15 Claims, 4 Drawing Sheets

(56) References Cited

U.S. PATENT DOCUMENTS

| | | |
|---|---|---|
| 8,755,965 B1 | 6/2014 | McClintic |
| 2005/0233810 A1 | 10/2005 | Chiang |
| 2006/0161871 A1 | 7/2006 | Hotelling et al. |
| 2010/0302359 A1 | 12/2010 | Adams et al. |
| 2010/0328204 A1 | 12/2010 | Edwards et al. |
| 2014/0127666 A1 | 5/2014 | Cevette et al. |
| 2015/0346722 A1 | 12/2015 | Herz et al. |

OTHER PUBLICATIONS

European Exam Report in related European Application No. 18203764.8 dated Mar. 11, 2019, 6 pages.

Kharitonov, Vasily Y., "A Software Architecture for the High-Level Development of Component-Based Distributed Virtual Reality Systems," 2013 IEEE 37th Annual Computer Software and Applications Conference, Jul. 22, 2013, 10 pages, XP032517812.

European Exam Report in related European Application No. 18203764.8 dated Sep. 13, 2019, 6 pages.

European Search Report in related European Patent Application No. 18203830.7 dated Mar. 14, 2019, 4 pages.

European Exam Report in related European Patent Application No. 18203830.7 dated Mar. 27, 2019, 9 pages.

European Search Report in related European Patent Application No. 18203832.3 dated Mar. 29, 2019, 4 pages.

European Exam Report in related European Patent Application No. 18203832.3 dated Apr. 10, 2019, 8 pages.

European Exam Report in related European Patent Application No. 18203832.3 dated Oct. 2, 2019, 7 pages.

European Search Report in related European Patent Application No. 18203830.7 dated Oct. 2, 2019, 6 pages.

Behrman, Amy, "NAVAIR Demonstrates Successful Airborne Control of UAV", Apr. 5, 2003; XP055668839, retrieved from Internet: URL:https://www.navy.mil/submit/display.asp?story_id=6681.

European Exam Report in related European Patent Application No. 18203832.3 dated Feb. 27, 2020, 8 pages.

European Exam Report in related European Patent Application No. 18203832.3 dated Jul. 17, 2020, 9 pages.

European Exam Report in related European Application No. 18203764.8 dated Oct. 21, 2020, 5 pages.

Anonymous: "CLS-E Rudder & CLS E-YOKE Bundle—Brunner," Aug. 16, 2017, pp. 1-7, XP055728814, retreived from the Internet: URL—https//web.archive.org/web/20170816104537/https://www.brunner-innovation.swiss/products/cls-e-yoke-bundle/ [retreived on Sep. 8, 2020].

European Exam Report in related European Application No. 18203764.8 dated Mar. 30, 2021, 4 pages.

VR EMULATOR ABOARD AIRCRAFT

CROSS-REFERENCE TO RELATED APPLICATIONS

This application claims priority under 35 U.S.C. § 119(e) to U.S. Provisional Patent Application No. 62/581,012 filed on Nov. 2, 2017, by Jeffrey Paul Nissen, et al., titled "VR Emulator," the disclosure of which is hereby incorporated by reference in its entirety.

STATEMENT REGARDING FEDERALLY SPONSORED RESEARCH OR DEVELOPMENT

Not applicable.

BACKGROUND

Military, commercial, and other operations generally involve a fleet of different vehicles. Some of these vehicles may include the capability of being operated and/or controlled remotely. However, operating and/or controlling a vehicle remotely presents many challenges, including signal, communication, and/or control latency due to large distances between a control center and a remote vehicle, delays in receiving accurate and/or real-time feedback, and/or other deficiencies that materially affect critical decision making during an operation.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
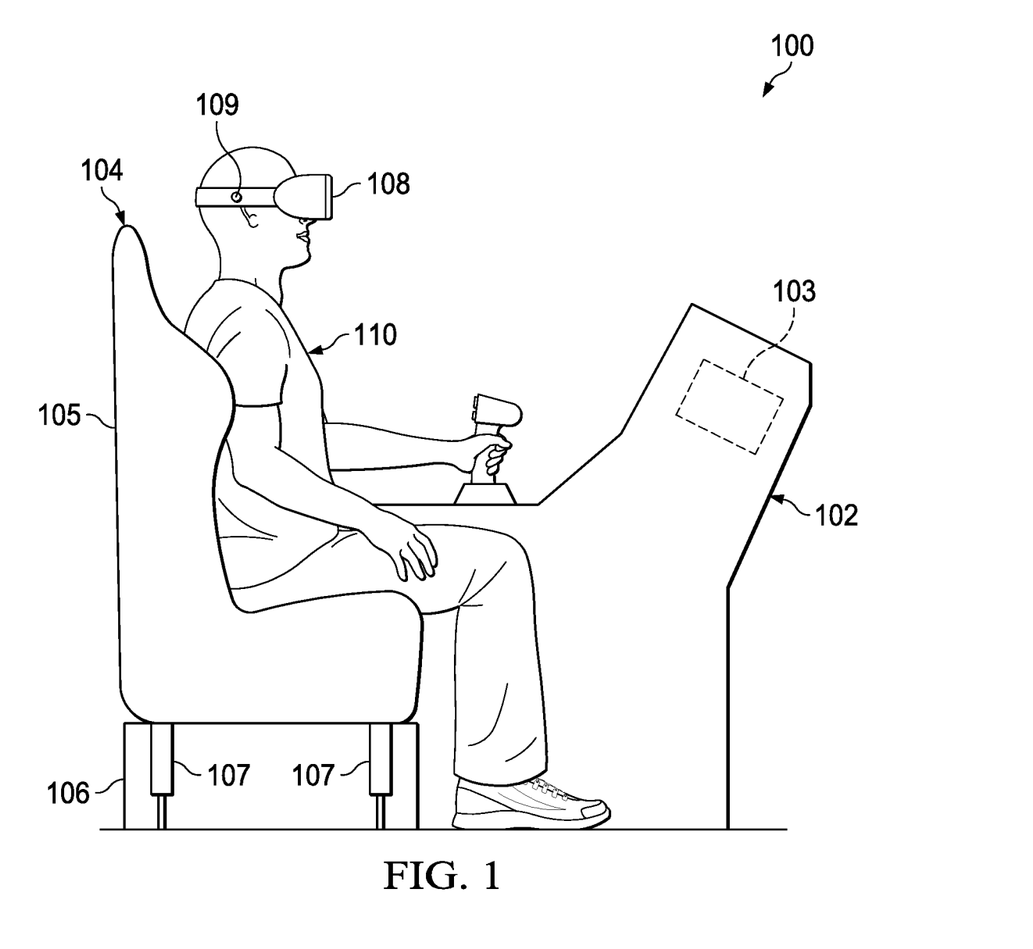
FIG. 1 is a side view of a virtual reality ("VR") flight emulator according to this disclosure.

Referring now to FIG. 1, a simplified side view of a virtual reality ("VR") flight emulator 100 is shown according to this disclosure. Flight emulator 100 generally comprises a virtual reality ("VR") system that simulates control, operation, and response of a remote vehicle (e.g., helicopter, tiltrotor, vertical take-off and landing (VTOL) aircraft, etc) and allows a user 110 to provide inputs via a pilot control interface 102 to control, operate, and/or otherwise manipulate the remote vehicle. Remote vehicle is defined as any vehicle that the flight emulator 100 is not installed in. As such, the remote vehicle may be in close proximity to the vehicle carrying the flight emulator 100. Further, it will be appreciated that while flight emulator 100 is described in the context of an aircraft, flight emulator 100 may also be applicable to other mobile equipment and vehicle types, including those found in automotive, construction, and marine applications. Flight emulator 100 comprises a pilot control interface 102, a motion-control seat 104 comprising a chair 105 connected to an articulating base 106 (or other articulating support system for chair 105, such as a robotic arm in which geared motors provide the articulation) that is selectively articulated and/or manipulated via a plurality of actuators 107, and a head-mounted display 108 worn by a user 110 that comprises a plurality of sensors, emitters, and/or reflectors 109 used to detect head movement of the user 110.

Pilot control interface 102 generally comprises physical and/or virtual flight control input hardware (e.g., flight input controls) configured to receive inputs and/or commands from user 110 to control operation of the remote vehicle and make the remote vehicle respond. Pilot control interface 102 also comprises vehicle and environmental virtual reality ("VR") software 103 configured to respond to the inputs and/or commands from the user 110 and simulate vehicle operational response in response to the inputs and/or commands from the user 110. The pilot control interface 102 is also configured to simulate operation of the remote vehicle through selective articulation of motion-control seat 104 and selectively displaying or adjusting graphical imagery shown to a user 110 on the head-mounted display 108. The pilot control interface 102 is generally specific to the vehicle controlled by the flight emulator 100. However, in some embodiments, the pilot control interface 102 may comprise a generic system comprising hardware components or input controls common to all aircraft or other remote vehicles. Additionally, as will be discussed later herein, the pilot control interface 102 may also be configured to control the vehicle carrying the flight emulator 100 as well as the remote vehicle upon virtually "teleporting" into the remote vehicle.

The motion-control seat 104 comprises an articulating chair 105 that is attached to the articulating base 106, the articulating chair 105 comprising a plurality of degrees of freedom. The degrees of freedom may comprise front-to-back motion, side-to-side motion, upwards/downwards motion, rotation about one or more axes, and/or any combination thereof. The articulating base 106 comprises a plurality of actuators 107, which may be, for example, electric, electro-mechanical, magnetic, pneumatic, and/or hydraulic, coupled to the pilot control interface 102. The actuators 107 are configured to selectively articulate or manipulate the motion-control seat 104 and/or portions of the base 106 to simulate the motion of, orientation of, and/or forces acting on the remote vehicle being controlled. Accordingly, as a result of operational parameters (e.g., speed, turning), environmental factors (e.g., wind gusts), and/or inputs of the user 110 through the pilot control interface 102, the motion-control seat 104 may be continuously articulated by the actuators 107 to simulate the motion of, orientation of, and/or forces acting on the remote vehicle and emulate or replicate those on the user 110. Thus, it will be appreciated that the flight emulator 100 utilizes a control loading system (CLS) to input the realistic motion of, orientation of, and/or forces acting on the remote vehicle that would be felt by a pilot of the remote vehicle, thereby allowing user 110 to receive feedback through the pilot control interface 102 and the motion-control seat 104 in order to "feel" exactly as if the user 110 of the flight emulator 100 were in the remote vehicle.

The head-mounted display 108 comprises a virtual reality ("VR") display that is worn on the head of a user 110. The head-mounted display 108 displays imagery visible to the user 110 that simulates or shows the actual environment of the remote vehicle. The head-mounted display 108 is also configured to display portions of the pilot control interface 102 when the pilot control interface 102 is in the line of sight of user 110. The head-mounted display 108 comprises a plurality of sensors, emitters, and/or reflectors 109 used to detect and track head movement of the user 110. The sensors, emitters, and/or reflectors 109 and the head-mounted display 108 are each coupled to components and/or software 103 of the pilot control interface 102, such that the imagery displayed to a user 110 on the head-mounted display 108 changes in response to head movement of the user 110. For example, when user 110 looks forward, user 110 may see through the windshield of a cockpit of a remote vehicle and portions of the pilot control interface 102, and when user 110 looks to the left, user 110 may see a co-pilot or leftward portions of the pilot control interface 102. Additionally, when user 110 is not virtually teleported into a remote vehicle, the head-mounted display 108 may not display imagery. Furthermore, when user 110 is not virtually teleported into a remote vehicle, the head-mounted display 108 may show a virtual representation of a state of a remote fleet of vehicles.

In operation, flight emulator 100 provides user 110 the capability to operate a remote vehicle while in a separate vehicle carrying the flight emulator 100. When user 110 is virtually teleported into the remote vehicle, inputs provided by user 110 through the pilot control interface 102 that cause the remote vehicle to respond and further cause the actuators 107 to selectively articulate or manipulate the motion-control seat 104 to simulate the effect of the motion of, orientation of, and/or forces acting on the remote vehicle. Additionally, the head-mounted display 108 may continuously adjust the imagery displayed to the user 110 to reflect what a pilot of the remote vehicle would see in response to head movement of the user 110 tracked by the sensors, emitters, and/or reflectors 109. For example, if user 110 provides an input to turn to the left, actuators 107 may be selectively operated to tilt the motion-control seat 104 to the left to simulate the "bank" of the turn as experienced by the remote vehicle, while also adjusting the imagery displayed to a user on the head-mounted display 108 to show the orientation of the remote vehicle. In a further example, actuators 107 may be selectively operated to provide vibration of the motion-control seat 104 in addition to the pilot control interface 102 alerting the user 110, for example, as to excessive speed, approaching a stall speed, and/or other known limits of the remote vehicle.

Figure 2:
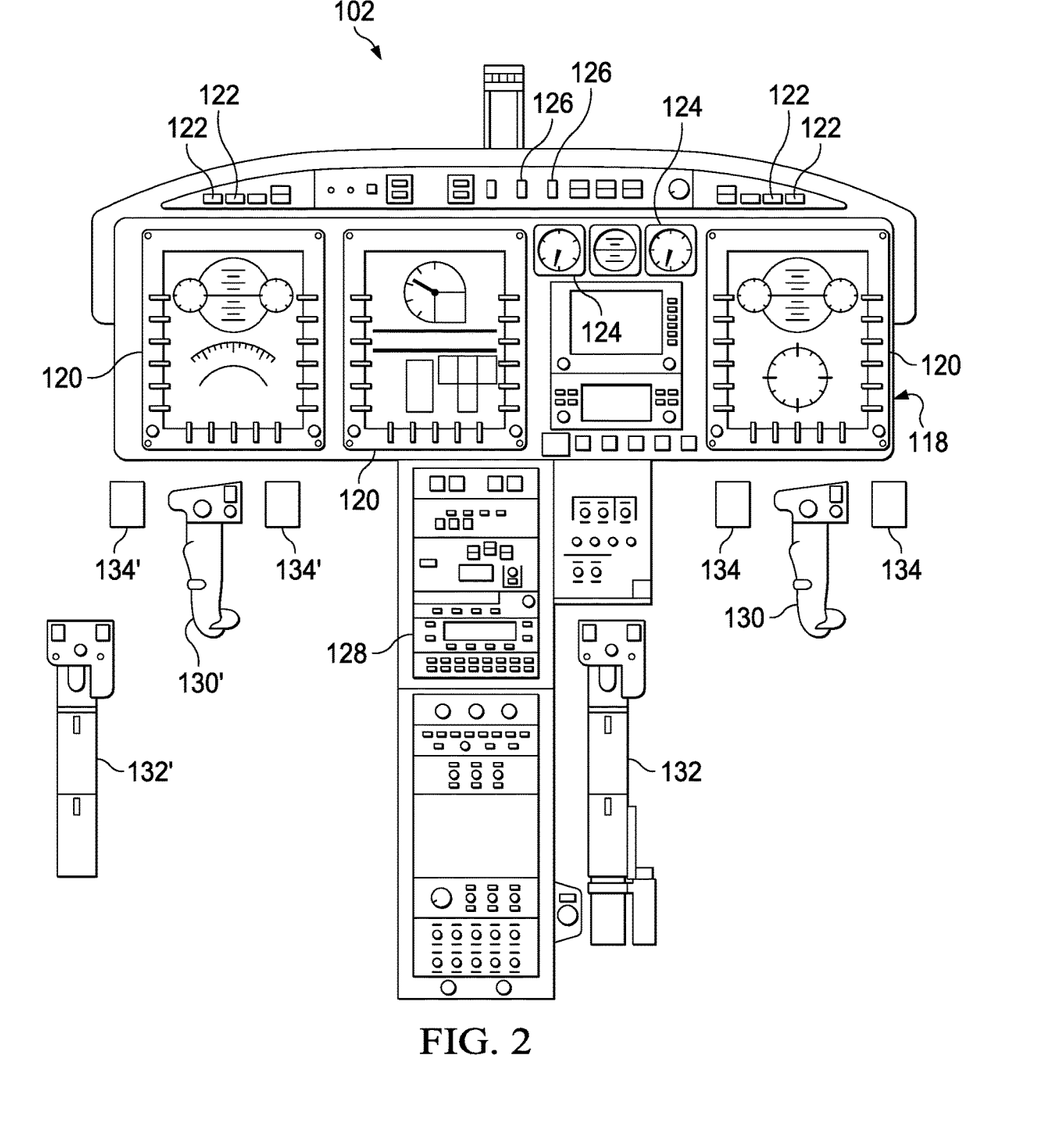
FIG. 2 is a diagram of a pilot control interface according to this disclosure.

Referring now to FIG. 2, a diagram of a pilot control interface 102 is shown according to this disclosure. In the embodiment shown, pilot control interface 102 comprises an instrument panel 118 comprising a plurality of touchscreen displays 120, warning and/or notification lights 122, mechanical and/or electrical gauges 124, mechanical and/or electrical switches 126, and/or other instrumentation 128 necessary to communicate and/or adjust operational parameters of the present vehicle carrying the flight emulator 100 in addition to a remote vehicle. However, in some embodiments, the pilot control interface 102 may comprise a virtual instrument panel 118 of a remote vehicle. Further, in some embodiments, the pilot control interface 102 may comprise a blank virtual display or multiple displays that populate with the appropriate gauges when the head mounted display 108 is worn by a user 110. Pilot control interface 102 may also comprise cyclic control 130, collective control 132, and/or pedals 134 for selectively manipulating operation of the remote vehicle. Additionally, in some embodiments, pilot control interface 102 may also comprise co-pilot cyclic control 130', co-pilot collective control 132', and/or co-pilot pedals 134'. In some embodiments, one or more touchscreen displays 120 may display a list of all remote vehicles connected through a network. Additionally, one or more touchscreen displays 120 may selectively alter their respective displays depending on the type of remote vehicle being controlled. As such, a single pilot control interface 102 or flight emulator 100 may be configured to emulate the controls of various remote vehicles.

Instrument panel 118 may generally comprise any combination of virtual, physical, simulated, and/or actual components 120, 122, 124, 126, 128, 130, 130', 132, 132', 134, 134' that allow a user 110 control over the present vehicle and a remote vehicle. In some embodiments, instrument panel 118 may comprise a mock instrument panel that allows actual physical interaction by a user 110 with one or more of the actual components 120, 122, 124, 126, 128, 130, 130', 132, 132', 134, 134' that would be present in an actual vehicle. As such, the head-mounted display 108 may be at least partially augmented or transparent to allow a user 110 to see and interact with one or more components 120, 122, 124, 126, 128, 130, 130', 132, 132', 134, 134'. Additionally, the flight emulator 100 may comprise a plurality of sensors, emitters, reflectors, and/or cameras used to anticipate or detect movement (e.g., arm motion, head motion) of a user 110 towards a component 120, 122, 124, 126, 128, 130, 130', 132, 132', 134, 134' to anticipate a command in order to reduce latency in the pilot control interface 102. Further, one or more touchscreen displays 120 may change its display depending on whether the flight emulator 100 is being used to control the present vehicle or a remote vehicle.

Figure 3:
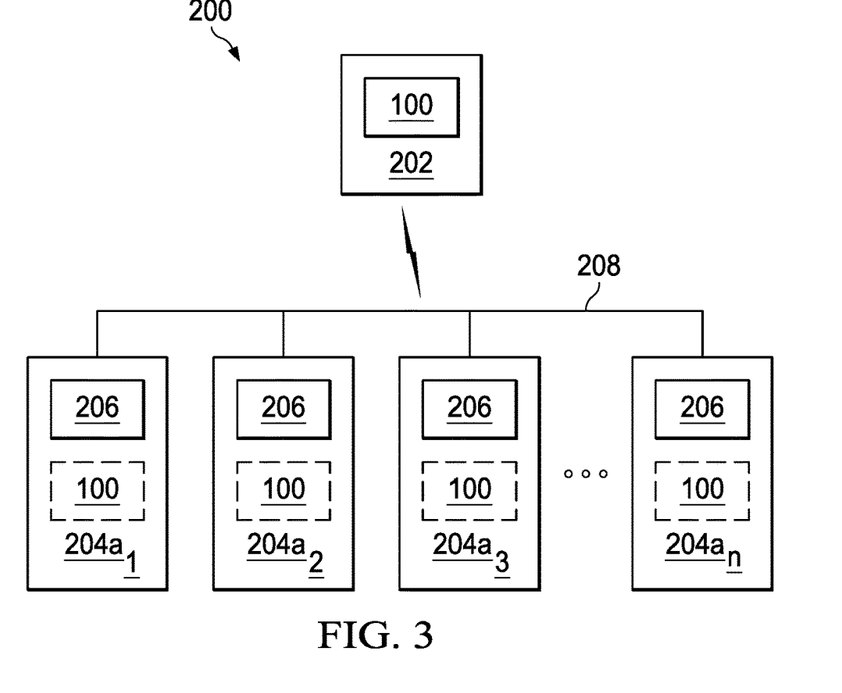
FIG. 3 is a schematic diagram of a virtual reality ("VR") flight teleport system according to this disclosure.

Referring now to FIG. 3, a schematic diagram of a virtual reality ("VR") flight teleport system 200 is shown according to this disclosure. Flight teleport system 200 comprises a master aircraft 202 and at least one remote aircraft 204 connected in communication through a wireless communication network 208, which may be wired, wireless, or any combination thereof. However, it will be appreciated that flight teleport system 200 may comprise any number of remote aircraft $204a_{1-n}$. Master aircraft 202 comprises a flight emulator 100 that may be in place of a pilot's seat, a co-pilot's seat, or in another location of the master aircraft 202, while each of the plurality of remote aircraft 204 comprise a flight control system 206 as known in the art for operating the associated remote aircraft 204. Additionally, in some embodiments, some or all of the remote aircraft 204 may also comprise a flight emulator 100. Master aircraft 202 may be substantially similar to any of the remote aircraft 204. However, master aircraft 202 comprises a flight emulator 100 having the ability to selectively virtually teleport user 110 into a remote aircraft 204 to assume control of any of the remote "slave" aircraft 204 on the network 208 via the flight emulator 100 in the master aircraft 202. This effectively allows a user 110 of the master aircraft 202, which may be a pilot, co-pilot, or other crew member of the master aircraft 202, to virtually teleport into and assume control of a fleet of remote aircraft 204 connected through the network 208.

In some embodiments, this capability may be encoded in the software 103 and/or made possible through components of the pilot control interface 102 of the flight emulator 100 of the master aircraft 202. Further, in some embodiments, it will be appreciated that the flight control system 206 of any of the remote aircraft 204 may comprise components or software necessary to allow the user 110 of the flight emulator 100 of the master aircraft 202 to assume control of its flight control system 206 and/or any of its other control systems (e.g. landing gear, weaponry). As such, when user 110 of the flight emulator 100 of the master aircraft 202 is virtually teleported into a remote aircraft 204, user 110 of the flight emulator 100 assumes at least partial control of the remote aircraft 204 through the network 208. When a remote aircraft 204 is virtually teleported into by a user 110, the flight control system 206 of the remote aircraft 204 may be locked out or disabled, such that a pilot of the remote aircraft 204 may not provide inputs to alter operation of the remote aircraft 204.

When a user 110 of the master aircraft 202 virtually teleports into another aircraft 204, the motion-control seat 104 of the flight emulator 100 in the master aircraft 202 may be selectively articulated by the actuators 107 to minimize or preferably cancel the motion of, orientation of, and/or forces acting on the master aircraft 202. The motion-control seat 104 is further articulated to emulate or replicate the motion of, orientation of, and/or forces acting on the remote aircraft 204. This allows the user 110 in the master aircraft 202 to "feel" the motion of, orientation of, and/or forces acting on the slave aircraft 204. For example, a user 110 of the master aircraft 202 may place the master aircraft 202 on a predetermined and/or automated flight plan such as a straight flight path, a large radius turn, or a flat hover, then virtually teleport into a remote aircraft 204. When user 110 is virtually teleported into the remote aircraft 204, the motion of, orientation of, and/or forces acting on the master aircraft 202 are minimized or preferably cancelled through articulation of the motion-control seat 104 of the flight emulator 100 in the master aircraft 202, and the motion-control seat 104 is further articulated such that the user 110 feels the motion of, orientation of, and/or forces acting on the remote aircraft 204. This may help a user 110 in the master aircraft 202 effectively operate the remote aircraft 204 or diagnose aircraft performance issues affecting the flight of the remote aircraft 204.

Furthermore, once virtually teleported into a remote aircraft 204, the user 110 in the master aircraft 202 may receive feedback through the pilot control interface 102 and instrument panel 118 of the flight emulator 100 of the master aircraft 202. Thus, for example, the user 110 may receive feedback via the cyclic control 130, collective control 132, and pedals 134 from the flight control system 206 of the remote aircraft 204. User 110 further may be able to observe readings on the gauges 124 and position of switches 126 of the flight emulator 100 through emulation of the flight control system 206 of the remote aircraft 204 on the pilot control interface 102. Additionally, the head-mounted display 108 worn by the user 110 in the master aircraft 202 replicates imagery from the remote aircraft 204. Thus, the user 110 in the master aircraft 202 may selectively observe gauges, instruments, and controls in the remote aircraft 204 that may not be replicated by the pilot control interface 102 when virtually teleported. Additionally, the head-mounted display 108 worn by the user 110 in the master aircraft 202 is used to detect head movement of the pilot via the sensors, emitters, and/or reflectors 109 and responsively adjusts the imagery displayed to the user 110 on the head-mounted display 108, thereby allowing the user 110 in the master aircraft 202 to selectively observe the environment of the remote aircraft 204. Accordingly, feedback through the pilot control interface 102, the motion-control seat 104, and the head-mounted display 108 of the flight emulator 100 in the master aircraft 202 provides real-time emulation capability that allows the user 110 in the master aircraft 202 to fully observe and control operation of the remote aircraft 204 when virtually teleported as if the user 110 in the master aircraft 202 were actually in the remote aircraft 204.

As an example, a piloted master aircraft 202 and a plurality of unmanned remote aircraft 204 may be flown in an attack or utility configuration simultaneously on a mission. A pilot or co-pilot of the master aircraft 202 may place the master aircraft 202 on a predetermined and/or automated flight plan, while virtually teleporting into an attack remote aircraft 204. When virtually teleported into the remote aircraft 204, the pilot or co-pilot of the master aircraft 202 is able to see through the head-mounted display 108 the environment surrounding the remote aircraft 204. The pilot of the master aircraft 202 may then assume control of the flight control system 206 of the attack remote aircraft 204 through the flight emulator 100 in the master aircraft 202 to perform a strike and/or other operation, then regain command of his/her physical master aircraft 202. The pilot or co-pilot of the master aircraft 202 may then virtually teleport into another remote aircraft 204 to perform specific operations before ending use of the flight emulator 100 in the master aircraft 202 and returning to operating the master aircraft 202. Thus, in this example, there is always a "pilot in command" when a critical decision, such as an offensive strike, is made, and the "pilot in command" of the remote aircraft 204 is the virtually teleported pilot or co-pilot in the master aircraft 202.

By virtually teleporting a user 110 from the master aircraft 202 into a nearby remote aircraft 204 via network 208, latency of communication (e.g., control signals, feedback, etc.) between the master aircraft 202 and the remote aircraft 204 may be significantly reduced when compared to a distant ground-based control station. Additionally, the network 208 allows communication and/or control without the use of satellites. Furthermore, the network 208 may use encrypted control inputs between a master aircraft 202 and a remote aircraft 204 to prevent the pilot control interface 102 and/or flight control system 206 of an aircraft 202 or remote aircraft 204 from being hacked or overridden. Additionally, in some embodiments, it will be appreciated that the virtually teleporting capabilities of the flight emulator 100 in the master aircraft 202 may be present in one or more of the remote aircraft 204 connected through network 208, so that multiple users 110 may virtually teleport into any of the other remote aircraft 204 on the network 208. As such, the network 208 may allow multiple teleporting users 110 simultaneously. In some embodiments, this may allow a user 110 of one remote aircraft 204 to overtake the controls of another remote aircraft 204 having an incapacitated pilot. As such, providing the virtually teleporting capabilities of the flight emulator 100 provides benefits such as increased situational awareness, increased accuracy, and/or quicker decision making during flight missions.

Figure 4:
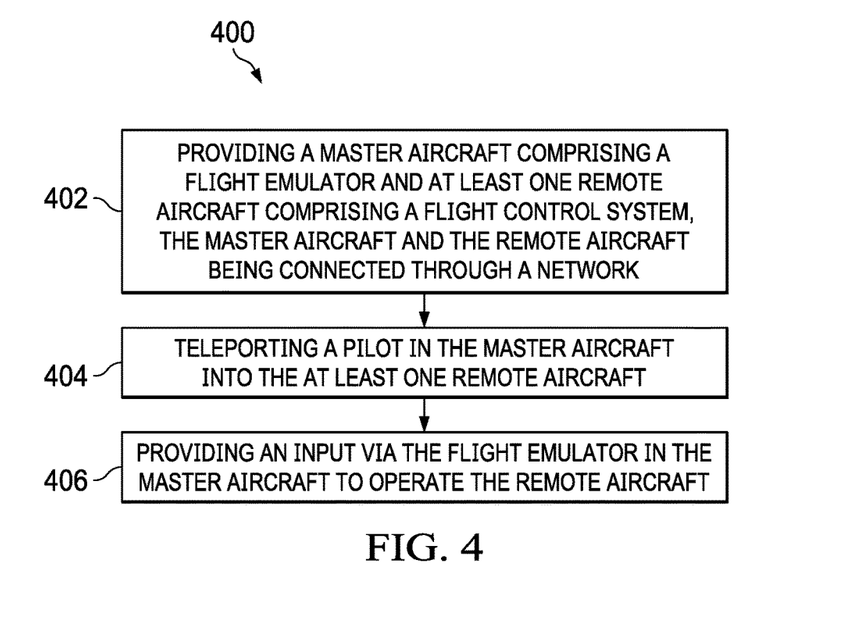
FIG. 4 is a flowchart of a method of operating a virtual reality ("VR") flight teleport system according to this disclosure.

Referring now to FIG. 4, a flowchart of a method 400 of operating a virtual reality ("VR") flight teleport system 200 is shown according to this disclosure. Method 400 begins at block 402 by providing a master aircraft 202 comprising a flight emulator 100 and at least one remote aircraft 204 comprising a flight control system 206, the master aircraft 202 and the remote aircraft 204 being connected through a network 208. Method 400 continues at block 404 by virtually teleporting a user 110 of the master aircraft 202 into the remote aircraft 204. When user 110 is virtually teleported into the remote aircraft 204, the flight emulator 100 in the master aircraft 202 may be selectively configured to emulate the motion of, orientation of, and/or forces acting on the remote aircraft 204. This is accomplished via the adjustment, movement, selection, or change of display of components 120, 122, 124, 126, 128, 130, 130', 132, 132' 134, 134' of the pilot control interface 102. Additionally, it will be appreciated that emulation is further accomplished via selective operation of the actuators 107 to articulate the motion-control seat 104 in the master aircraft 202 to minimize or preferably cancel the motion of, orientation of, and/or forces acting on the master aircraft 202, prior to further articulating the motion-control seat 104 in the master aircraft 202 to simulate the motion of, orientation of, and/or forces acting on the remote aircraft 204. Further, it will be appreciated that this is accomplished via replicating visual imagery through the head-mounted display 108 of the master aircraft 202 depending on the head movement and/or orientation of the user HO of the master aircraft 202. Method 400 concludes at block 406 by the user 110 of the master aircraft 202 providing an input via the flight emulator 100 in the master aircraft 202 to operate the remote aircraft 204. This may be accomplished via the user 110 in the master aircraft 202 providing an input via a component 118, 120, 122, 124, 126, 128, 130, 130', 132, 132', 134, 134' of the pilot control interface 102 that causes the flight control system 206 of the remote aircraft 204 to adjust, alter, change, or select a mode or parameter of operation of the remote aircraft 204.

Figure 5:
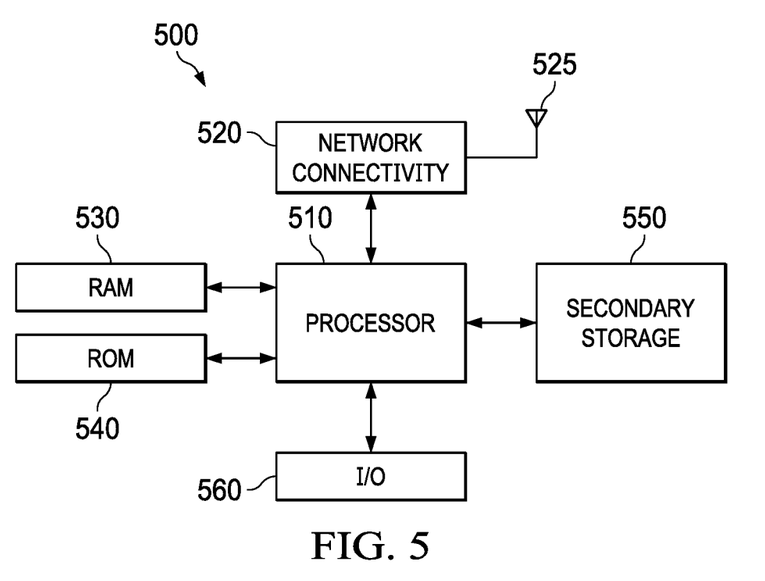
FIG. 5 is a simplified diagram of a general-purpose processor (e.g., electronic controller or computer) system suitable for implementing the embodiments of this disclosure.

Referring now to FIG. 7, a simplified diagram of a general-purpose processor (e.g. electronic controller or computer) system 500 suitable for implementing the embodiments of this disclosure is shown. System 500 that includes a processing component 510 suitable for implementing one or more embodiments disclosed herein. Particularly, the above-described flight emulators 100, pilot control interfaces 102, instrument panels 118, and/or flight teleport systems 200 may comprise one or more systems 500. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the system 500. It will be appreciated that the data described herein can be stored in memory and/or in one or more databases.

The processor 510 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 510 is shown, multiple processors may be present. Thus, while instructions may be discussed as being executed by processor 510, the instructions may be executed simultaneously, serially, or otherwise by one or multiple processors 510. The processor 510 may be implemented as one or more CPU chips and/or application specific integrated chips (ASICs).

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information.

The network connectivity devices 520 might also include one or more transceiver components 525 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 525 might include separate receiving and transmitting units or a single transceiver. Information transmitted or received by the transceiver 525 may include data that has been processed by the processor 510 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touchscreen displays, keyboards, keypads, switches, dials, mice, track balls, voice recognizers, card readers, paper tape readers, printers, video monitors, transducers, sensors, or other well-known input or output devices. Also, the transceiver 525 might be considered to be a component of the I/O devices 560 instead of or in addition to being a component of the network connectivity devices 520. Some or all of the I/O devices 560 may be substantially similar to various components disclosed herein and/or may be components of flight emulator 100, pilot control interfaces 102, instrument panels 118, and/or flight control systems 206.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A master aircraft, comprising:
    a flight emulator comprising a pilot control interface and a motion-control seat, wherein the flight emulator is configured to allow a user of the flight emulator to virtually teleport into a slave aircraft connected in communication to the flight emulator through a network for operating a flight control system of the slave aircraft;
    wherein the motion-control seat is selectively articulated to minimize for the user a perception of motion of, orientation of, or forces acting on the master aircraft while emulating motion of, orientation of, or forces acting on the slave aircraft when the user is virtually teleported into the slave aircraft.

2. The aircraft of claim 1, wherein the pilot control interface is configured to allow the user to control operation of the slave aircraft when the user is virtually teleported into the slave aircraft.

3. The aircraft of claim 1, wherein the flight emulator comprises a head-mounted display worn by the user.

4. The aircraft of claim 3, wherein the head-mounted display is configured to replicate visual imagery related to the slave aircraft and further configured to continuously adjust the imagery in response to head movement of the user when the user is virtually teleported into the slave aircraft.

5. The aircraft of claim 1, wherein the slave aircraft is an un-manned aircraft.

6. The aircraft of claim 1, wherein the slave aircraft is a manned aircraft.

7. A flight teleport system, comprising:
    at least one slave aircraft comprising a flight control system; and
    a master aircraft connected in communication to the at least one slave aircraft through a network, the master aircraft comprising:
        a flight emulator comprising a pilot control interface and a motion-control seat, wherein the flight emulator is configured to allow a user of the flight emulator to virtually teleport into the at least one slave aircraft for operating the flight control system of the slave aircraft;
    wherein the motion-control seat is selectively articulated to minimize for the user a perception of motion of, orientation of, or forces acting on the master aircraft while emulating motion of, orientation of, or forces acting on the slave aircraft when the user is virtually teleported into the slave aircraft.

8. The flight teleport system of claim 7, wherein the pilot control interface is configured to allow the user to control operation of the slave aircraft when the user is virtually teleported into the slave aircraft.

9. The flight teleport system of claim 8, wherein the flight control system of the slave aircraft is overridden when the user is virtually teleported into the slave aircraft.

10. The flight teleport system of claim 7, wherein the flight emulator comprises a head-mounted display worn by the user.

11. The flight teleport system of claim 10, wherein the head-mounted display is configured to replicate visual imagery visible from the slave aircraft and further configured to continuously adjust the imagery in response to head movement of the user when the user is virtually teleported into the slave aircraft.

12. The flight teleport system of claim 7, wherein communication between the master aircraft and the slave aircraft is accomplished without the use of satellites, and wherein latency of communication is reduced as compared to communication through the use of satellites.

13. A method of operating a flight teleport system, comprising:
    providing a master aircraft comprising a fight emulator comprising a pilot control interface and a motion-control seat;
    virtually teleporting a user of the flight emulator into a slave aircraft connected in communication to the master aircraft;
    selectively articulating the motion-control seat to minimize for the user a perception of motion of, orientation of, or forces acting on the master aircraft while emulating motion of, orientation of, or forces acting on the slave aircraft when the user is virtually teleported into the slave aircraft; and
    providing an input via the pilot control interface to operate a flight control system of the slave aircraft.

14. The method of claim 13, further comprising: operating the slave aircraft in response to an input made by the user into the pilot control interface when the user is virtually teleported into the slave aircraft.

15. The method of claim 13, further comprising: replicating visual imagery visible from the slave aircraft on a head-mounted display worn by the user; and continuously adjusting the imagery in response to head movement of the user.

* * * * *